United States Patent [19]

Dänekas et al.

[11] Patent Number: 5,709,455
[45] Date of Patent: Jan. 20, 1998

[54] NIGHT-TIME SAFETY SYSTEM

[75] Inventors: Rolf Dänekas, Waldfeucht; Willi Panhausen, Gangelt, both of Germany

[73] Assignee: Spanset Inter AG, Oetwil am See, Switzerland

[21] Appl. No.: 730,022

[22] Filed: Oct. 11, 1996

[30] Foreign Application Priority Data

Oct. 12, 1995 [DE] Germany ............ 295 16 809 U

[51] Int. Cl.[6] ........................................... B60Q 1/26
[52] U.S. Cl. ........................ 362/83.3; 362/61; 359/548; 359/549
[58] Field of Search .................... 359/548, 533, 359/549; 362/61, 83.3

[56] References Cited

U.S. PATENT DOCUMENTS

| | | | |
|---|---|---|---|
| 5,402,266 | 3/1995 | Coligionis | 359/548 |
| 5,539,624 | 7/1996 | Dougherty | 362/61 |

FOREIGN PATENT DOCUMENTS

| | | |
|---|---|---|
| 0 275 531 | 7/1988 | European Pat. Off. |
| 87 01 082 | 5/1987 | Germany . |
| 36 18 615 | 12/1987 | Germany . |
| 37 22 858 | 1/1989 | Germany . |
| 38 02 861 | 8/1989 | Germany . |
| 39 10 053 | 10/1990 | Germany . |
| 40 37 475 | 5/1992 | Germany . |
| 92 12 905 | 1/1993 | Germany . |
| 43 03 024 | 6/1993 | Germany . |
| 44 18 301 | 11/1995 | Germany . |
| 82/00272 | 2/1982 | WIPO . |

*Primary Examiner*—Carroll B. Dority
*Attorney, Agent, or Firm*—Spencer & Frank

[57] ABSTRACT

A transport vehicle includes a tractor portion, a trailer portion connected to the tractor portion, supply lines extending from the tractor portion to the trailer portion, and a protective tubing having an outer casing and extending from the tractor portion to the trailer portion and enclosing the supply lines. The vehicle further includes a night-time safety system carried by the transport vehicle and including a visual signal unit attached to the outer casing.

16 Claims, 5 Drawing Sheets

NIGHT-TIME SAFETY SYSTEM

CROSS REFERENCE TO RELATED APPLICATIONS

The instant application claims the priority of DE-295 16 809.9 filed in Germany on Oct. 12, 1995. The subject matter of DE-295 16 809.9 is being incorporated herein by reference.

STATEMENT REGARDING FEDERALLY SPONSORED RESEARCH OR DEVELOPMENT

Not Applicable.

FIELD OF THE INVENTION

The present invention relates to a transport vehicle. The vehicle includes a tractor portion, a trailer portion connected to the tractor portion, supply lines extending from the tractor portion to the trailer portion, and a protective tubing extending from the tractor portion to the trailer portion and enclosing the supply lines, the protective tubing having an outer casing.

BACKGROUND OF THE INVENTION

It is customary in the art to use transport vehicles comprising a tractor for driving the vehicle and a trailer connected to the tractor for transporting long, usually rod-shaped load elements such as logs, as shown in EP-A-0 312 815 and DE-U-8 702 917. In transport vehicles such as the one mentioned above, it is the load elements proper which form the actual structural connection between the tractor and the trailer, the load elements being preferably tightly tied in position in fork-like holding arrangements disposed on both the tractor and the trailer. As a result of the above, both the tractor and the trailer are so tightly connected by way of the load elements that the tractor indirectly pulls the trailer.

For safety reasons, a transport vehicle, which is elongated by virtue of the long load elements carried thereon, should be clearly visible, particularly at night-time. The front end and tail end of the transport vehicle, corresponding to the tractor and the trailer, respectively, can be easily recognized in the dark by virtue of the presence of vehicle-mounted lights or headlights on the tractor and taillights on the trailer. The recognizability of the two lateral sides of the transport vehicle, however, can pose problems. The above problems are solved according to the prior art by securing individual visual signal units such as reflectors on the load elements at predetermined distances from one another. It is further known in the art, particularly in transporting logs, to simply nail reflectors to the individual logs. For longer precast concrete components, prior art reflectors are either screwed or glued to the components.

On the one hand, the prior art arrangement of reflectors on the transport vehicle as described above, and especially the manner of attachment of the reflectors to the load elements, has the drawback that the reflectors must be reattached to the load elements during each loading process, and must further be removed after each unloading process. The above arrangement is very time-consuming and cost-intensive. In addition, because of the frequently prevailing time pressures involved in loading and unloading transport vehicles, the associated attachment and removal of the reflectors is often performed only in a very careless manner. A consequence of the above drawback is that individual reflectors are frequently lost during transport. In addition to the material loss involved, the most important disadvantage of the above is that the lost reflectors are no longer effective for the protection of the vehicle.

BRIEF SUMMARY OF THE INVENTION

It is an object of the present invention to eliminate the above drawbacks by providing a night-time safety system which is implemented quickly and reliably.

The above object, together with other objects which will become apparent as the description of the invention progresses, are accomplished according to the invention by the provision of a transport vehicle including a tractor portion, a trailer portion connected to the tractor portion, supply lines extending from the tractor portion to the trailer portion, and a protective tubing extending from the tractor portion to the trailer portion and enclosing the supply lines, the protective tubing having an outer casing. The transport vehicle further includes a night-time safety system carried by the transport vehicle, the night-time safety system including a visual signal unit attached to the outer casing.

The invention takes advantage of the fact that the supply lines or signal lines supplying electricity to electrical consumers on the trailer, which lines run from the tractor to the trailer, are usually arranged in a protective tubing. The protective tubing encases the supply lines and protects them from external influences which could lead to damage. According to the invention, visual signal units are attached to the outer casing of the protective tubing. Since the protective tubing extends almost over the entire lateral length of the transport vehicle, it is possible to also utilize the entire length of the protective tubing as an effective length for the attachment of the signal units.

The main advantage of the present invention is that the signal units are permanently attached to the protective tubing and hence to the transport vehicle. As a result of the above, the steps of attaching and removing the signal units during loading and unloading, which steps are necessary in the implementation of safety systems of the prior art, are eliminated. Another advantage of the present invention is that the signal units are reliably and firmly connected to the protective tubing so that it is almost impossible for them to drop off or be lost during the trip.

According to one embodiment of the invention, two visual signal units are disposed diametrically opposite one another on the outer casing such that each visual signal unit faces a corresponding lateral side of the transport vehicle. The above arrangement has the advantage that it saves material while complying with the applicable safety standards.

According to another embodiment of invention, the visual signal unit is configured as a strip. A plurality of the strips may be randomly distributed over an outer surface of the outer casing, thus providing a safety system which may be implemented in a technically simple and economical manner.

According to yet another embodiment of the invention, the visual signal unit is a continuous visual signal strip extending along an entire length of the outer casing.

According to a further embodiment of the invention, the visual signal strip may advantageously be either sewn, glued or welded to the outer casing.

In a preferred embodiment of the invention, the visual signal unit is an electrically powered active unit. In particular, electrically light-emitting conductors or light-emitting elements on the basis of electrical luminescence can be implemented as active units in a technically simple manner. Active units can be connected to the on-board electrical supply system of the transport vehicle, which system is already in existence, in order to obtain the electrical power they require therefrom. The above arrangement has the advantage that it renders the provision of any additional sources of energy for powering the active units superfluous. As a result of the above, the active units may be implemented in a technologically simple manner while providing the needed level of safety for the transport vehicle at night-time. A further advantage of using active visual signal units is that the units are effective independently of any external illumination thereof, such as illumination by virtue of a vehicle approaching the transport vehicle.

According to yet another embodiment of the invention, the active unit may be configured as a foil band attached to the protective tubing. An advantage of the above embodiment is that use of the foil band results in a space-saving implementation of the instant invention. Another advantage of the above embodiment is that the foil band is well protected against damage by virtue of its flat geometry.

According to another embodiment of the invention, the visual signal unit is a passive unit, such as, for example, a phosphorescent unit or a reflective unit. Passive units are technically simple and economical to manufacture by virtue of their passive mode of operation. The passive unit may be in the form of a paint or a paste, such as those readily available on the market. The paint or paste may be applied either on the entire outer surface of the outer casing, or, alternatively, over a portion of this outer surface, particularly in the form of a signal strip, in order to save some paint or paste material.

According to a further embodiment of the invention, the passive unit is configured to be woven on the outer casing, in this manner affording a particularly long life to the signal unit while allowing an economical implementation of the same. The passive unit may comprise yarns, monofilament threads or the like, which may be woven onto the outer casing such that the resulting signal unit is raised with respect to an outer surface thereof. These yarns and monofilament threads may be synthetic, and may further be either phosphorescent or reflective. The yarns and monofilament threads may also be woven onto the outer surface of the outer casing in the form of a strip. The raised feature of the woven-in signal unit has the additional advantage that the visibility of the signal unit, which deteriorates due to an unavoidable soiling thereof during use, can be improved by simply wiping the projecting, raised fabric components.

BRIEF DESCRIPTION OF THE DRAWINGS

The invention will be described below in greater detail in connection with embodiments thereof that are illustrated in the drawing figures.

DETAILED DESCRIPTION OF THE INVENTION

Figure 1:
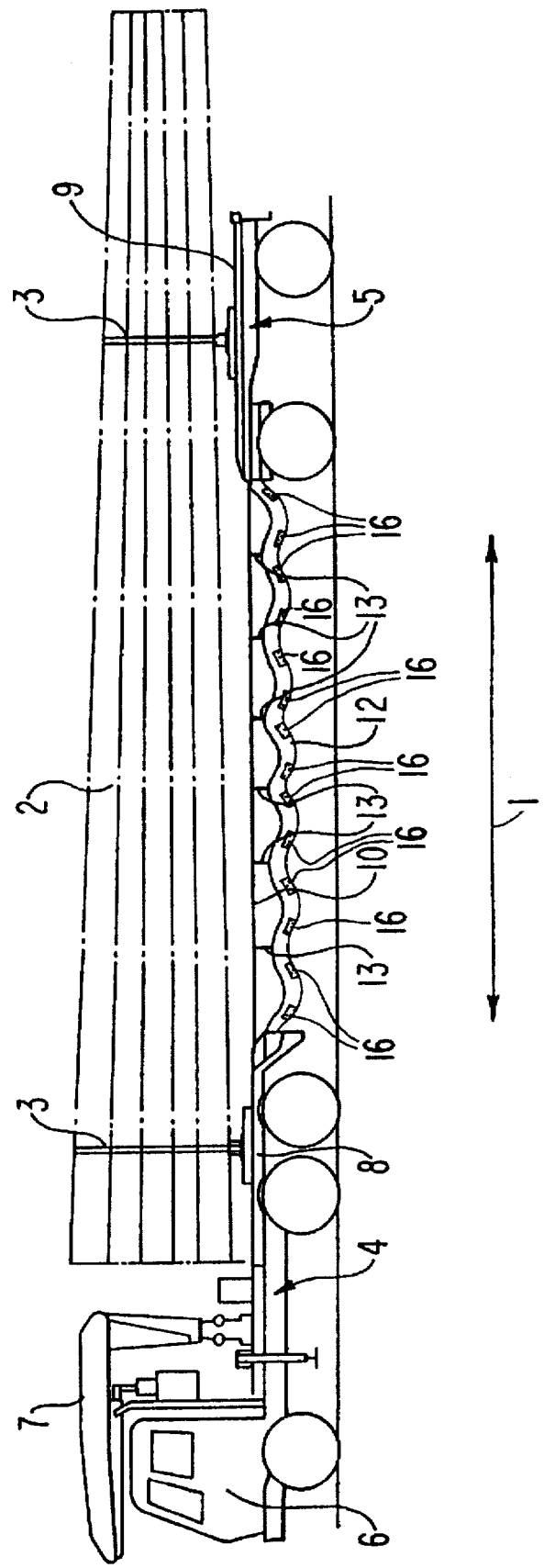
FIG. 1 is a side elevational view of the transport vehicle having visual signal strips attached thereto according to the invention.

Turning first to FIG. 1, rod-shaped load elements, or load material 2, extend in the longitudinal direction of the transport vehicle 1. The load material is tightly tied in position and secured in fork-like holding arrangements 3 disposed on both a tractor or tractor portion 4 and a trailer or trailer portion 5. Tractor 4 is essentially comprised of a driver's cab 6, a vehicle-mounted crane 7 and a support surface 8 for supporting arrangements 3 thereon on the front end of the transport vehicle.

Trailer 5 in turn includes a support surface 9 for supporting arrangements 3 thereon on the tail end of the transport vehicle. The protective tubing 12, which receives and protectively encases supply lines 11 in an inner chamber 14 thereof (FIG. 2), is held in position between the tractor and the trailer by means of holding elements 13 connected a steel cable 10 stretched between the respective support surfaces 8 and 9 of tractor 4 and trailer 5. As depicted in FIG. 1, holding elements support the protective tubing at regions disposed at a distance with respect to one another along a length of the protective tubing such that the tubing is supported in a wave-shaped manner. The above support arrangement for the protective tubing allows the tractor and the trailer to be disposed at various distances with respect to one another.

If, at night or at twilight, a vehicle with its lights turned on approaches one of the sides of the transport vehicle illustrated in FIG. 1, at least one of the two reflective signal units 16 is picked up by the headlamp light and reflects this light. As a result of the reflection, the driver of the vehicle recognizes that he/she is facing an excessively long transport vehicle and, if necessary, the driver can operate the vehicle brakes or react in an otherwise appropriate manner.

Figure 2:
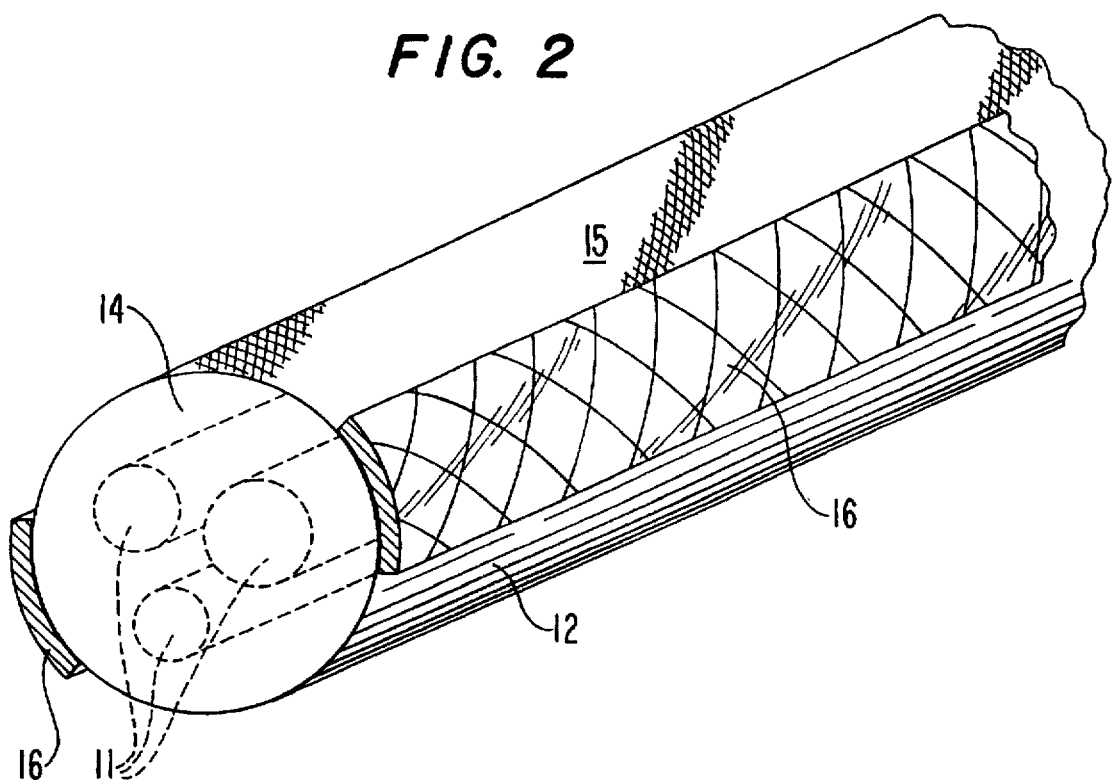
FIG. 2 is a perspective view of a section of a protective tubing having reflective signal strips attached to an outer casing thereof according to the invention.

Turning now to FIG. 2, two visual signal units 16 in the form of reflective or phosphorescent strips are attached to an outer casing 15 of protective tubing 12 such that they are diametrically opposite one another.

Figure 3:
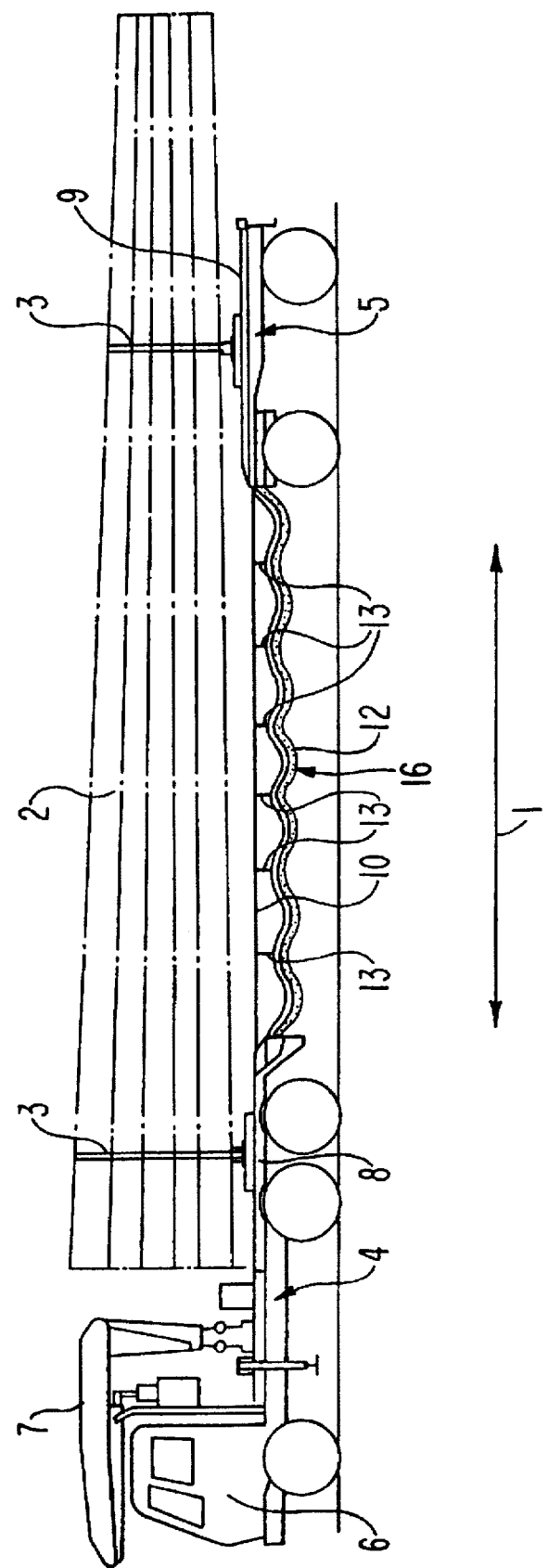
FIG. 3 is a view similar to FIG. 1 showing the visual signal unit configured as a continuous strip.

In FIG. 3, the visual signal unit 16 is configured as a continuous strip extending along an entire length of the outer casing 15.

Figure 4A:
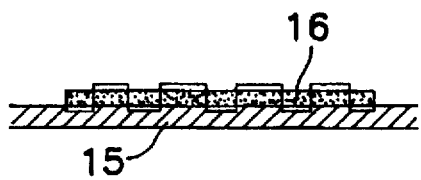
FIG. 4a is a longitudinal cross sectional view of a wall portion of the outer casing showing the visual signal unit as having been sewn on the outer casing.
Figure 4B:
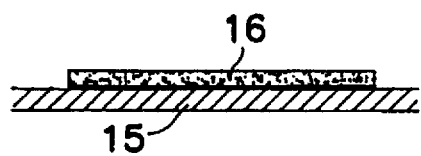
FIG. 4b is a view similar to FIG. 4a showing the visual signal unit as having been glued or welded to the outer casing.

FIGS. 4a and 4b depict longitudinal cross-sectional views of the wall of the outer casing portion 15, and show the visual signal strip 16 as having been sewn on the outer casing 15 on the one hand (FIG. 4a), and as having been glued or welded to the outer casing 15 on the other hand (FIG. 4b).

Figure 5:
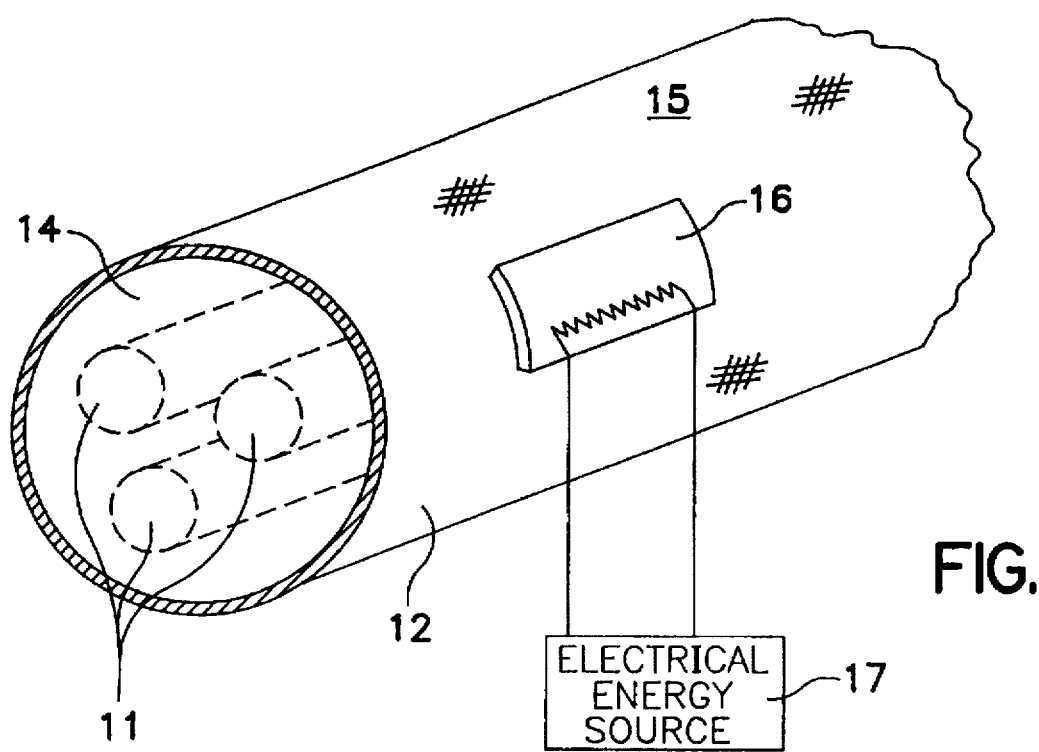
FIG. 5 is a view similar to FIG. 2 showing the visual signal unit as an active unit connected to the on-board electrical energy source of the transport vehicle.

In FIG. 5, the visual signal unit 16 is an active unit connected to the on-board electrical energy source 17 of the transport vehicle in order to receive electrical power therefrom.

Figure 6A:
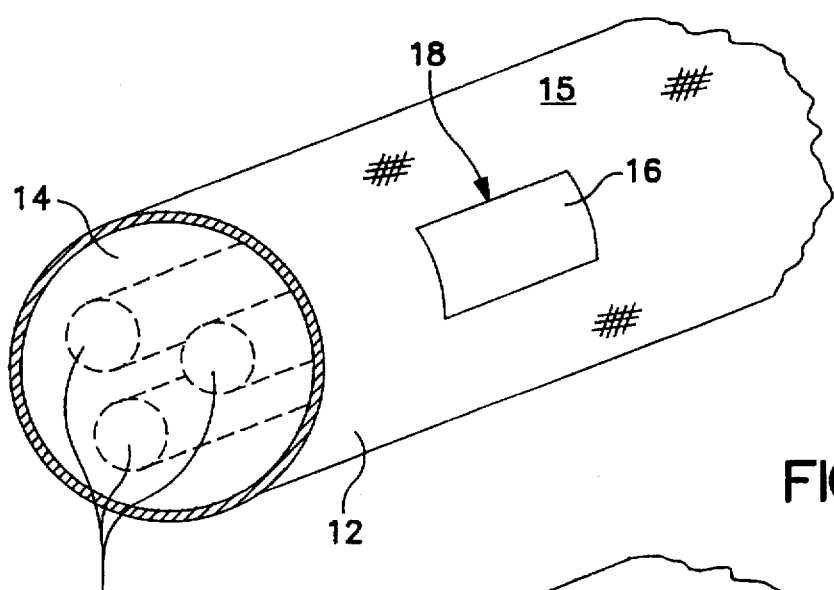
FIGS. 6a is a view similar to FIG. 2 showing the visual signal unit as being in the form of a paint applied to the outer casing.
Figure 6B:
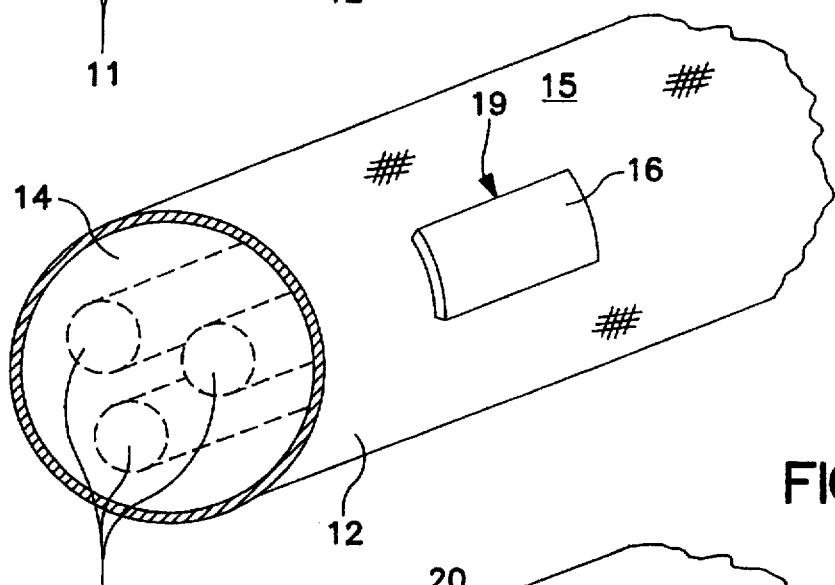
FIG. 6b is a view similar to FIG. 6a showing the visual signal unit as being in the form of a paste applied to the outer casing.

FIGS. 6a and 6b depict the visual signal unit 16 as being in the form of a paint 18 (FIG. 6a) and a paste 19 (FIG. 6b) applied to the outer surface of outer casing 15.

Figure 7:
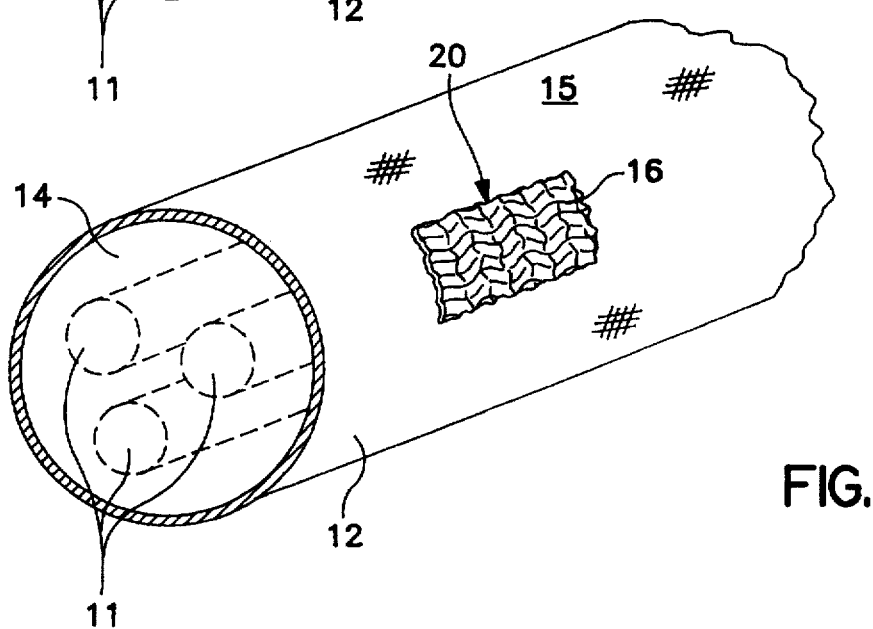
FIG. 7 is a view similar to FIG. 2 showing the visual signal unit as comprising yarns or monofilament fibers woven on the outer casing.

FIG. 7 shows the visual signal unit 16 as a unit configured as a strip and comprised of yarns or monofilament fibers woven on the outer casing 15 such that it is raised with respect to an outer surface of the outer casing.

The invention now being fully described, it will be apparent to one of ordinary skill in the art that any changes and modifications can be made thereto without departing from the spirit and scope of the invention as set forth in the appended claims.

We claim:

1. A transport vehicle comprising:

(a) a tractor portion;

(b) a trailer portion connected to the tractor portion;

(c) supply lines extending from the tractor portion to the trailer portion;

(d) a protective tubing extending from the tractor portion to the trailer portion and enclosing the supply lines, the protective tubing having an outer casing; and (e) a night-time safety system carried by the transport vehicle, the night-time safety system comprising a visual signal unit attached to the outer casing.

2. The safety system according to claim 1, wherein there are provided two visual signal units disposed diametrically opposite one another on the outer casing such that each visual signal unit faces a corresponding lateral side of the transport vehicle.

3. The safety system according to claim 1, wherein the visual signal unit is configured as a strip.

4. The safety system according to claim 1, wherein there are provided a plurality of visual signal units configured as strips and randomly distributed over an outer surface of the outer casing.

5. The safety system according to claim 3, wherein the visual signal unit is configured as a continuous strip extending along an entire length of the outer casing.

6. The safety system according to claim 3, wherein the visual signal strip is one of sewn, glued and welded onto the outer casing.

7. The safety system according to claim 1, wherein the visual signal unit is an electrically powered active unit.

8. The safety system according to claim 1, wherein the transport vehicle further includes an on-board electrical energy source, the active unit being connected to the electrical energy source for receiving electrical power therefrom.

9. The safety system according to claim 1, wherein the visual signal unit is a passive unit.

10. The safety system according to claim 9, wherein the passive unit is at least one of a phosphorescent unit and a reflective unit.

11. The safety system according to claim 10, wherein the passive unit is at least one of a paint and a paste applied to an outer surface of the outer casing.

12. The safety system according to claim 9, wherein the passive unit is configured to be woven on the outer casing.

13. The safety system according to claim 12, wherein the passive unit comprises at least one of yarns and monofilament threads.

14. The safety system according to claim 13, wherein the passive unit comprises synthetic fibers.

15. The safety system according to claim 12, wherein the passive unit is configured to be woven on the outer casing such that it is raised with respect to an outer surface of the outer casing.

16. The safety system according to claim 12, wherein the passive unit is configured as a strip.

\* \* \* \* \*